UNITED STATES PATENT OFFICE.

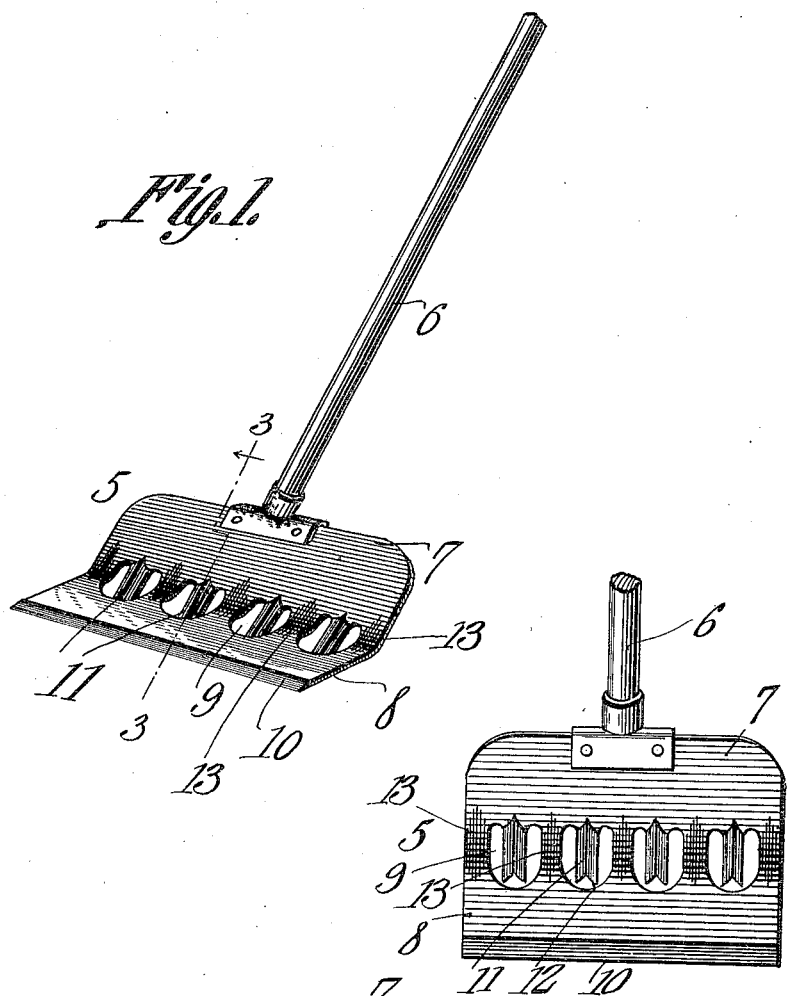

PETER ROBARGE, OF WILLINK, NEW YORK.

ICE-TOOL.

964,453.  Specification of Letters Patent.  Patented July 12, 1910.

Application filed April 1, 1910. Serial No. 552,813.

*To all whom it may concern:*

Be it known that I, PETER ROBARGE, a citizen of the United States, residing at Willink, in the county of Erie and State of New York, have invented a new and useful Ice-Tool, of which the following is a specification.

This invention has relation to devices for removing frozen snow and ice from side walls, and has for its object to provide a simple and efficient device of this kind, and also one which can be employed for cutting grooves in the ice or frozen snow to make a path having a rough surface.

With these objects in view, the invention consists in a novel construction and arrangement of parts as will be hereinafter described and claimed.

The invention is illustrated in the accompanying drawing, in which,

Figure 1 is a perspective view of the same. Fig. 2 is a front elevation. Fig. 3 is a section on the line 3—3 of Fig. 1.

In the drawing, 5 denotes the blade of the device and 6 is a handle to which the blade is fastened in any suitable manner. The blade comprises upper and lower sections 7 and 8, respectively, extending at an angle to each other. The upper portion extends in line with the handle, and the lower portion is arranged at an oblique angle thereto. At the junction of the upper and lower portion of the blade is a series of openings 9 arranged in a row extending transversely of the blade. The extremity of the lower portion of the blade is brought to a sharp edge 10. Formed integral with the upper portion of the blade, are teeth 11 which are bent rearwardly through the openings 9, so as to project from the back of the blade in line with the upper portion 7 thereof. The extremities of the teeth are formed into two sharp points 12 as shown in Fig. 2.

The teeth 11 are corrugated in the direction of their length, which strengthens them and also forms teeth having a tendency to cut or shear downwardly into the ice. The back of the teeth are beveled to form the sharp points, and they may therefore be sharpened from beneath, and are also self-sharpening. The portions of the blade between the openings 9, and at the ends of the blade, are corrugated as indicated at 13 to give strength to the blade when it is used as a spud. Each tooth has a single corrugation, said corrugation or ridge being on the underside, so that when the tooth is sharpened, the double point is retained. The teeth are self-sharpening when scraped on a stone or cement walk.

In use, when it is desired to make a rough path on the ice or frozen snow, the blade is placed in a position so that the points of the teeth 11 come in contact with the surface of the ice or snow, as shown in Fig. 3. The blade is then run over the frozen surface, whereupon grooves are cut in the same by the teeth, and a path may thus be made having a rough surface.

The device herein described is simple in construction, and can be easily operated as stated, and it therefore effectually serves the purpose for which it is desired.

What is claimed is:

1. A device of the class described comprising a blade having upper and lower portions extending at an angle to each other, the back of the blade, at the junction of said portions having a plurality of projecting teeth extending in alinement with the upper portion of the blade.

2. A device of the class described comprising a blade having upper and lower portions extending at an angle to each other, and having a row of openings at the junction of said upper and lower portions, and teeth on the upper portion of the blade projecting through the openings to extend from the back of the blade.

3. A device of the class described comprising a blade having two portions extending at an angle to each other, and the back of the blade, at the junction of said portions having a plurality of projecting teeth.

In testimony that I claim the foregoing as my own, I have hereto affixed my signature in the presence of two witnesses.

PETER ROBARGE.

Witnesses:
 WILLIAM E. PIERCE,
 WELLS W. PARKER.